(12) United States Patent
Metcalf et al.

(10) Patent No.: US 8,472,988 B2
(45) Date of Patent: Jun. 25, 2013

(54) 2-WAY TEXTING THROUGH HOSTED APPLICATIONS

(75) Inventors: Michael D. Metcalf, Lake Forest, CA (US); Tracy Roberts, Mountain View, CA (US)

(73) Assignee: Voice Assist, Inc., Lake Forest, CA (US)

( * ) Notice: Subject to any disclaimer, the term of this patent is extended or adjusted under 35 U.S.C. 154(b) by 0 days.

(21) Appl. No.: 13/220,547

(22) Filed: Aug. 29, 2011

(65) Prior Publication Data

US 2012/0052888 A1     Mar. 1, 2012

Related U.S. Application Data

(60) Provisional application No. 61/377,864, filed on Aug. 27, 2010.

(51) Int. Cl.
*H04W 4/00*          (2009.01)
(52) U.S. Cl.
USPC ............... 455/466; 455/412.1; 455/412.2; 455/413
(58) Field of Classification Search
USPC ........... 455/412.1, 412.2, 413, 550.1, 418, 455/466, 566
See application file for complete search history.

(56) References Cited

U.S. PATENT DOCUMENTS

2008/0209347 A1 *  8/2008  Malik et al. .................. 715/758
2011/0300833 A1 * 12/2011  Shaw ............................ 455/413

* cited by examiner

*Primary Examiner* — Kathy Wang-Hurst
(74) *Attorney, Agent, or Firm* — BP Law Group

(57) ABSTRACT

The invention is apparatus for communicating between a subscriber and a second party in a 2-way texting system. The apparatus includes a hosted application system, having a host application server, storage, communication apparatus and a hosted application. A subscriber's 2-way communication device is coupled to the communication apparatus and assigned a unique designator. The hosted application system is coupled to receive a message and designated recipient from a message originator's 2-way communication device. The message originator is one of the subscriber and the second party, and the recipient is the other of the subscriber and the second party. The hosted application converts the message to a designated format and delivers the message using the unique designator, to the recipient's 2-way communication device. The message can be responded to by the recipient using the unique designator.

19 Claims, 1 Drawing Sheet

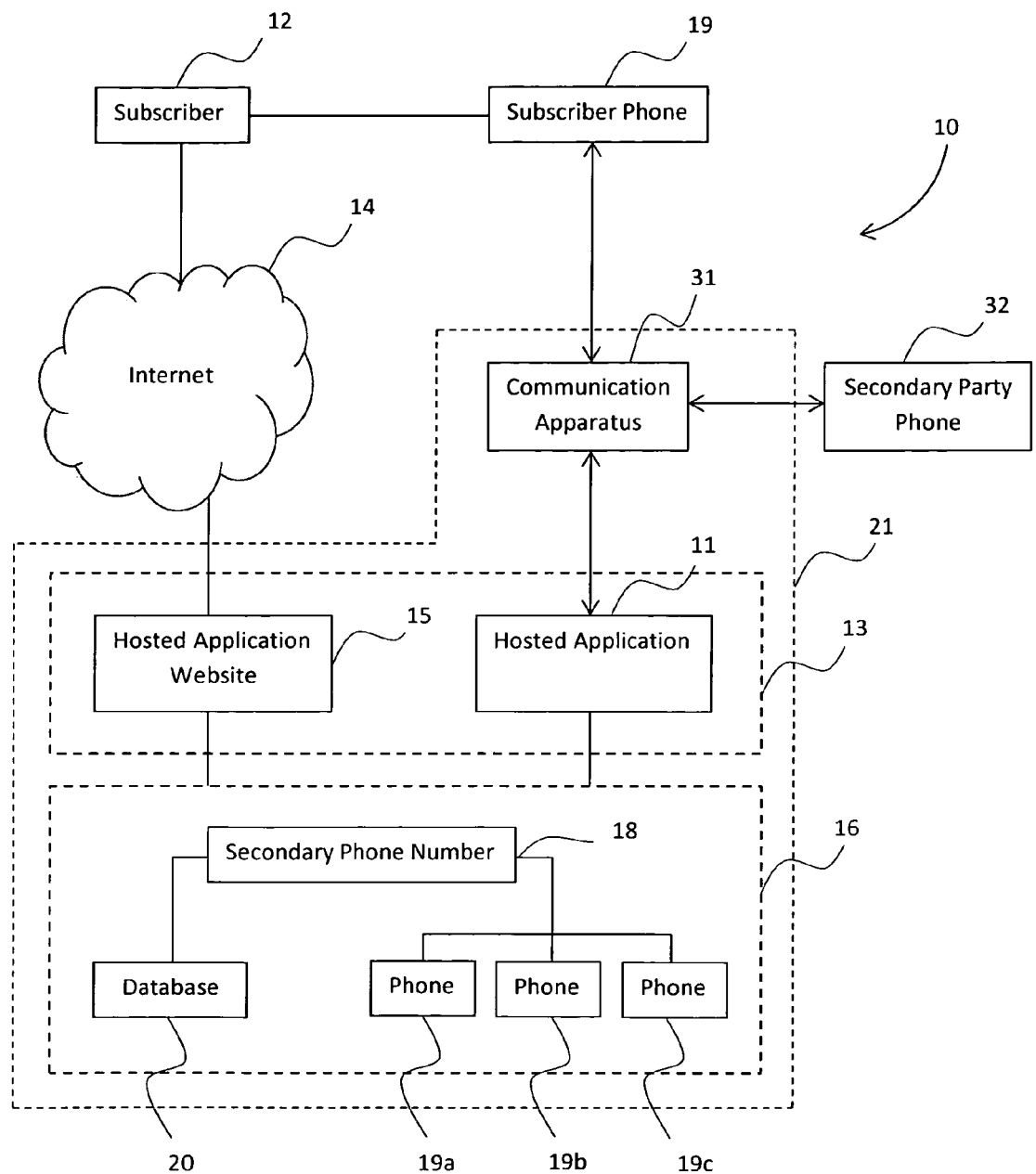

2-WAY TEXTING THROUGH HOSTED APPLICATIONS

CROSS-REFERENCE TO RELATED APPLICATION

This application claims the benefit of U.S. Provisional Patent Application No. 61/377,864, filed Aug. 27, 2010.

FIELD OF THE INVENTION

This invention relates to telecommunications systems and methods.

More particularly, the present invention relates to SMS messaging with voice user interface.

BACKGROUND OF THE INVENTION

In the field of communications, and particularly mobile communications, devices such as cell phones and PDAs can make and receive calls, transfer data and interact with value added services or hosted applications. Mobile devices are becoming ubiquitous in society, and are employed for maintaining contact information, personal management, scheduling, and entertainment, as well as communication. As these devices become more and more prevalent, they also become problematic in that they take attention away from everyday activities such as driving, walking and the like. In particular, a type of communication known as SMS messaging (text messaging) is quickly growing and actually becoming more common than talking on the phone. While very useful, it has the drawback of requiring concentration for reading and writing text. While easily accomplished when other activities are curtailed, often individuals multitask, texting while walking, driving, etc. This diverts attention from the activity and can become an extreme hazard for the individual and others.

To overcome this and other problems, hosted applications have been developed which can process an incoming message and forward the processed or value added message onto the desired recipient. Thus, a user can subscribe to a service which will alter the message, such as from speech to text, to prevent, for example a driver from texting while driving. In this example, the individual contacts the hosted application, speaks the message and provides the destination address, such as a phone number. The service converts the voice message to text and sends an SMS message employing their designation, which is typically a short code. While effective, this presents a problem for the recipient of the message. A reply message cannot be sent as in conventional peer to peer texting because the designation of the originator is the short code of the hosted application provider. Thus, 2-way texting is prevented since the recipient must determine who sent the message and find their associated number in order to reply.

It would be highly advantageous, therefore, to remedy the foregoing and other deficiencies inherent in the prior art.

An object of the present invention is to provide 2-way texting with value added processing.

Another object of the present invention is to provide 2-way texting through a hosted application wherein the message can be manipulated as desired.

Yet another object of the present invention is to provide a method of delivering a text message to wireless communication devices and wired communication devices.

SUMMARY OF THE INVENTION

Briefly, to achieve the desired objects and advantages of the instant invention provided is apparatus for communicating between a subscriber and a second party in a 2-way texting system. The apparatus includes a hosted application system, having a host application server, storage, communication apparatus and a hosted application. A subscriber's 2-way communication device is coupled to the communication apparatus and assigned, in the hosted application, a unique designator. The hosted application system is coupled to receive a message and designated recipient from a message originator's 2-way communication device. The message originator is one of the subscriber and the second party, and the recipient is the other of the subscriber and the second party. The hosted application converts the message to a designated format, and delivers the message having the designated format and associated with the unique designator, to the recipient's 2-way communication device. The message can be responded to by the recipient using the unique designator.

In a specific aspect, the message originator is the subscriber and the message is an audio message sent to the hosted application by way of the communication apparatus from subscriber's 2-way communication device. A display message is provided to the recipient's 2-way communication device from the hosted application by way of the communication apparatus. The recipient is the second party.

In another aspect, the message originator is the second party and the message is a display message sent to the hosted application by way of the communication apparatus from the second party's 2-way communication device. An audio message is provided to the recipient's 2-way communication device from the hosted application by way of the communication apparatus. The recipient is the subscriber.

In yet a further aspect, a method of communicating between a subscriber and a second party in a 2-way texting system is provided. The method includes providing a hosted application system having a hosted application server, storage, communication apparatus, and a hosted application. An individual contacts the hosted application and the hosted application designates the individual a subscriber and assigns a unique designator to the subscriber. A message originator contacts the hosted application with a 2-way communication device and provides a message and designates a recipient using the unique designator of the subscriber. The message originator is one of the subscriber and the second party and the recipient is the other of the subscriber and the second party. The hosted application receives the message, manipulates the message as desired by the subscriber, and delivers the manipulated message to a recipient's 2-way communication device using the unique designator. The message can be responded to by the recipient using the unique designator.

BRIEF DESCRIPTION OF THE DRAWING

Specific objects and advantages of the instant invention will become readily apparent to those skilled in the art from the following detailed description of a preferred embodiment thereof taken in conjunction with the drawing, in which:

FIG. 1 is a block diagram of a 2-way messaging system according to the present invention.

DETAILED DESCRIPTION OF THE PREFERRED EMBODIMENTS

In conventional 2-way SMS messaging (2-way texting), a first mobile SMS device can contact a second mobile SMS device, which in turn can reply because the designation (i.e. phone number) of the first mobile SMS device is associated with the SMS message. Each SMS network includes a short message service center (SMSC) which acts as a store-andforward mechanism providing guaranteed delivery of short messages to a subscriber. Conventional SMS technology allows a SMS client to send messages to other SMS clients via the SMSC. The SMS clients can be of the same Mobile Network Operator (MNO), different MNO, or can be roaming. Typically, the local SMSC is configured to query the network (e.g., a destination Home Location Register (HLR) in the mobile network) to route the SMS message properly to the destination network and the second mobile SMS device.

In addition, SMSCs can support short codes or large accounts that are specific addresses for allowing routing from applications or services rather than a terminating device. SMSC short codes allow SMS clients to send messages to applications or services. Currently, some of these applications or services are utilized to forward the message to, for example, the second mobile SMS device. In this instance, however, the 2-way SMS messaging is interrupted. The address or designator now associated with the message is the short code, for example, of the application provider or service. Thus, the second mobile SMS device cannot reply to the sender's number, but must reply through some manipulation of the short code there is no associate designator other than the application provider or service.

The present invention is a method and system for 2-way SMS messaging (2-way texting) through a hosted application. To enable 2-way texting, the hosted application assigns to a subscriber a unique designator which in this embodiment is a 10 digit secondary phone number. A subscriber contacts the hosted application, provides a message and designates a recipient. The hosted application then manipulates the message, as desired by the subscriber and provided by the application, and delivers it to the recipient who may or may not be a subscriber. This message is associated with the secondary phone number and therefore can be responded to by the recipient in a 2-way process similar to conventional peer to peer texting.

Turning now to FIG. 1, a block diagram illustrating a 2-way texting system generally designated 10 is illustrated. In 2-way texting system 10, an entity desirous of using a hosted application 11 contacts hosted application 11 and becomes a subscriber 12. To begin the process, subscriber 12 contacts hosted application 11, such as through the Internet 14 to a hosted application website 15. Hosted application 11 and website 15 are typically software components run on a computer such as a hosted application server 13, which can include single or multiple components, in one location or many locations. Hosted application 11, website 15 and server 13 are components of a hosted application system 21 which includes a communication apparatus 31. Contact with hosted application website 15 can be accomplished in any well known manner, such as using a desk top computer, a hand held computer, a smart phone, or any device capable of functioning over the Internet. The subscription process includes setting up a subscription account 16. Subscription account 16 is assigned a unique designator such as a 10-digit secondary telephone number 18. The secondary telephone numbers are actual telephone numbers used as a unique designator. Each secondary phone number, in this embodiment, is a 10-digit number as that is the format used by the North American Numbering Plan Administration from which the numbers are allocated. It will be understood that in other locations other numbering schemes may be employed. Subscriber 12 can designate multiple phones 19a, 19b, 19c, etc., including mobile phones, wired phones, smart phones and the like or any combination thereof, each having a telephone number, to account 16. Phones 19 associated with account 16, to which secondary phone number 18 is assigned, can be changed, deleted or expanded as desired by subscriber 12 through internet 14 to hosted application website 15. Thus, when any of the associated phones 19 are used, hosted application 11 automatically logs in the call as subscriber 12. Variations of this method can be employed, such as always requiring a PIN number assigned at the time of subscription, or, as in the present embodiment, only requiring a PIN number when an unassociated telephone is used. Each account 16 also includes a data base 20 of names and associated telephone numbers of contacts of subscriber 12. Data base 20 of contact numbers can be expanded and altered as desired by subscriber 12. The system can include many and diverse choices, but is essentially to assign a secondary phone number 18 to the account.

Preferably, hosted application 11 includes a Voice User Interface (VUI) which permits operation of subscriber 12 phones 19 in a hands-off manner. Through account 16, subscriber 12 can designate the notification/contact method they want employed by hosted application 11. In other words, subscriber 12 can setup subscription account 16, and change this setup to include which specific phone 19 to contact and receive messages on, the order of contact on multiple phones, and contact on devices such as through e-mail, fax and the like. Thus, an incoming message can be directed to any selected phone or phones (19a, 19b, 19c, etc.), including e-mails, faxes and the like, as desired and can take the form of an audio message or a display message.

In using this method and system, a subscriber can send a SMS message to a recipient through the hosted application which works in conjunction with a conventional SMS peer to peer system. The hosted application can manipulate the SMS message both, from the Sender and from the Receiver. In other words, the Sender can send a display message by actually typing a text message into a phone and sending it to the host application, or send an audio message by speaking the message to the host application. The host application can then take the display text and send it on with the secondary number of the Sender, or convert the audio message to a text message and send it on. The benefit of passing the SMS message through a hosted application includes the ability to manipulate the message while maintaining 2-way texting.

When sending a message, subscriber 12, using one of phones 19 or a different phone and a PIN (or other proof of subscription), creates a text message via the VUI of hosted application 11 in a manner consistent with current methods. However instead of being sent by hosted application 11 to a recipient phone 32 through a short code, the message is sent from subscriber's unique designator, secondary phone number 18. To recipient phone 32 it appears as a standard text message with a phone number from the sender, not from a short code. By employing secondary phone number 18, recipient's phone 32 can text to the unique designator, secondary phone number 18, as either a reply or a new text. In other words, SMS messaging can originate from subscriber 12 or from someone else to subscriber 12 using secondary phone number 18. Thus, a message originator, which can be the subscriber or a second party, contacts the hosted application either knowingly in the case of subscriber 12 or as a consequence of using a subscriber's secondary phone number 18 in the case of the second party, with a communication device. The message originator provides a message and designated recipient (subscriber 12 or second party) using the unique designator number of the subscriber. The term "using the secondary phone number" in the case of the subscriber means it is the number assigned to the subscriber and used by the hosted application as the number from which the SMS message came. In the case of a second party originating a message to the subscriber, the term "using the secondary phone number" means that the number is used as the destination for the message.

When receiving messages, a text message is received by host application server 13 and stored. Then depending on the subscriber's preferences the host application can call the subscriber and read the text message through text to voice manipulation of the message, forward the message to an email address, forward the message to a designated cell phone, or any combination thereof. A copy of the text message is also preferably displayed on account 16 of host application web site 15 accessible by subscriber 12. When subscriber 12 receives a message by phone, hosted application 11 calls the phone number specified by subscriber 12. If the phone number is not one of associated phones 19, then subscriber 12 needs to log in to hear the message. Once logged in or if one of phones 19 is employed, then hosted application 11 reads subscriber 12 the text message.

When subscriber 12 sends a message to a recipient, subscriber uses the VUI of hosted application 11 to record a voice message and select the recipient from their address book (data base 20) by saying a designator, such as a name or the like. The message is then sent to the recipient by the subscriber's secondary phone number. When the recipient responds or if the recipient originates a text to the subscriber's unique secondary phone number, then the hosted application receives the text and stores the Sender phone number, Sender name (matched against address book) and message content.

2 way texting can be delivered to a mobile phone by audio or display. A send and received audio example begins with subscriber 12 calling hosted application 11 and dictating a message to be sent and stating the desired recipient of the message. Hosted application manipulates the message as desired, such as converting the audio message to a text message, and sends the SMS message using the subscriber's secondary phone number. The recipient replies to the message by sending a SMS message using the secondary phone number as the recipient. Hosted application 11 calls subscriber 12 at a designated phone number associated with secondary phone number 18 and reads the text message. Subscriber 12 can then reply back by dictating a reply. In this example, hosted application 11 takes the dictated message, transcribes it and then sends the SMS from subscriber's secondary phone number 18 to recipient's mobile phone number. Then the recipient's mobile phone number replies to subscriber's secondary phone number 18. The reply is received by hosted application 11 which then calls the designated phone number and reads the text message.

An audio out, display return example begins with subscriber 12 calling hosted application 11 and dictating an SMS message to be sent. The recipient replies but in this case hosted application 11 forwards the incoming SMS to the subscriber's designated mobile phone. In this example, hosted application 11 transcribes the dictated recording from subscriber 12 and sends the SMS from subscriber's secondary phone number 18 to recipient's mobile phone number. The recipient's mobile phone number then replies to subscriber's secondary phone number 18. Hosted application receives the reply, checks to see whether the recipient's mobile phone number is associated with a secondary phone number of their own account and then forwards it to the subscriber's secondary phone number 18 using a secondary phone number of their own account as the Text From number.

A display out, display back example begins when a Sender sends an SMS from their mobile phone to a subscriber's secondary phone number. This SMS is then forwarded to the subscriber's designated mobile phone. The subscriber can simply reply to the incoming message. In this example, the SMS is sent to subscriber's secondary phone number. Hosted application 11 checks to see whether the Sender mobile phone number is associated with a secondary phone number of their own account. If it is, the hosted application then forwards the SMS to the subscriber's designated mobile number using the secondary phone number of their own account as the Text From number. This allows the recipient subscriber to reply back to the secondary phone number of senders own account.

By employing the system of the present invention, SMS messaging can be sent from or received by devices without displays, such as landlines, or by phones that are not subscribed to a text plan, and the like. By employing hosted application 11, a subscriber can receive a text in audio form to prevent distraction from another activity, such as driving, or because the phone used does not have a display or has no subscription to a text plan. In the same manner, a text can be sent to a recipient phone by the subscriber of the present system dictating a message to the hosted application of the present invention, which then transcribes the recording and forwards it as an SMS message. It should also be noted, again, that because the system of the present invention sends the SMS message from the subscriber's secondary phone number, the recipient can reply as if it was a standard peer to peer SMS message.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. In a 2-way texting system, apparatus for communicating between a subscriber and a second party comprising:
   a hosted application system, including a host application server, storage, communication apparatus and a hosted application;
   a plurality of subscriber's 2-way communication devices coupled to the communication apparatus and assigned in the hosted application a unique designator, wherein the unique designator is a secondary telephone number;
   the hosted application system coupled to receive a message and designated recipient from a message originator's 2-way communication device, wherein the message originator is one of the subscriber and the second party, and wherein the recipient is the other of the subscriber and the second party; and
   the hosted application converts the message to a designated format, and delivers the message having the designated format and associated with the unique designator, to the recipient's 2-way communication device, whereby the message can be responded to by the recipient using the unique designator,
   wherein the subscriber may designate in the hosted application an order of contact of the plurality of subscriber's 2-way communication devices.

2. Apparatus for communicating between a subscriber and a second party as claimed in claim 1 wherein the message is one of an audio message and a display message sent to the hosted application by way of the communication apparatus and one of a display message and an audio message is provided to the recipient from the hosted application by way of the communication apparatus.

3. Apparatus for communicating between a subscriber and a second party as claimed in claim 1 wherein the message originator is the subscriber and the message is an audio message sent to the hosted application by way of the communication apparatus from one of the plurality of subscriber's 2-way communication devices and a display message is provided to the recipient's 2-way communication device, the recipient being the second party, from the hosted application by way of the communication apparatus.

4. Apparatus for communicating between a subscriber and a second party as claimed in claim 1 wherein the message originator is the second party and the message is a display message sent to the hosted application by way of the communication apparatus from the second party's 2-way communication device and an audio message is provided to one of the plurality of recipient's 2-way communication devices, the recipient being the subscriber, from the hosted application by way of the communication apparatus.

5. Apparatus for communicating between a subscriber and a second party as claimed in claim 1 wherein the unique designator is a secondary phone number.

6. Apparatus for communicating between a subscriber and a second party as claimed in claim 1 wherein the hosted application system is coupled to the Internet and includes a hosted application website.

7. In a 2-way texting system, apparatus for communicating between a subscriber and a second party comprising:
   a hosted application system, including a host application server, storage, communication apparatus and a hosted application;
   a plurality of subscriber's 2-way communication devices couplable to the communication apparatus and assigned in the hosted application a unique designator, wherein the unique designator is a secondary telephone number;
   a second party's 2-way communication device couplable to the communication apparatus, the communication apparatus of the hosted application system coupled to receive a message and selection of a recipient having a recipient's 2-way communication device from a message originator's 2-way communication device, wherein the message originator's 2-way communication device is one of the subscriber's 2-way communication device and the second party's 2-way communication device, and wherein the recipient's 2-way communication device is the other of the subscriber's 2-way communication device and the second party's 2-way communication device; and
   the hosted application converts the message to a designated format, and delivers the message having file designated format and associated with the unique designator, to the recipient's 2-way communication device, whereby the message can be responded to by the recipient using the unique designator,
   wherein the subscriber may designate in the hosted application an order of contact of the plurality of subscriber's 2-way communication devices.

8. Apparatus for communicating between a subscriber and a second party as claimed in claim 7 wherein the second party's 2-way communication device is couplable to the communication apparatus of the hosted application system by using the unique designator.

9. Apparatus for communicating between a subscriber and a second party as claimed in claim 8 wherein communication apparatus of the hosted application system is couplable to one of the plurality of subscriber's 2-way communication devices using the unique designator to identify one of the plurality of subscriber's 2-way communication devices.

10. Apparatus for communicating between a subscriber and a second party as claimed in claim 9 wherein the message is one of an audio message and a display message sent to the hosted application by way of the communication apparatus and one of a display message and an audio message is provided to the recipient's 2-way communication device from the hosted application by way of the communication apparatus.

11. Apparatus for communicating between a subscriber and a second party as claimed in claim 9 wherein the message originator is the subscriber and the message is an audio message sent to the hosted application by way of the communication apparatus from one of the plurality of subscriber's 2-way communication devices and a display message is provided to the recipient's 2-way communication device, the recipient being the second party, from the hosted application by way of the communication apparatus.

12. Apparatus for communicating between a subscriber and a second party as claimed in claim 9 wherein the message originator is the second party and the message is a display message sent to the hosted application by way of the communication apparatus from the second party's 2-way communication device and an audio message is provided to the plurality of the recipient's 2-way communication devices, the recipient being the subscriber, from the hosted application by way of the communication apparatus.

13. Apparatus for communicating between a subscriber and a second party as claimed in claim 9 wherein the unique designator is a secondary phone number.

14. In a 2-way texting system, a method of communicating between a subscriber and a second party comprising the steps of:
   providing a hosted application system including a hosted application server, storage, communication apparatus, and a hosted application;
   receiving contact at the hosted application from an individual and the hosted application designating the individual a subscriber and assigning a unique designator to the subscriber, wherein the unique designator is a secondary telephone number;
   receiving contact at the hosted application from a message originator with a 2-way communication device and providing a message and designated recipient using the unique designator of the subscriber wherein the message originator is one of the subscriber and the second party, and wherein the recipient is the other of the subscriber and the second party; and
   the hosted application receiving the message, manipulating the message, as desired by the subscriber, and delivering the manipulated message to one of a plurality of a recipient's 2-way communication devices using the unique designator, whereby the message can be responded to by the recipient using the unique designator,
   wherein the recipient may designate in the hosted application an order of contact of the plurality of recipient's 2-way communication devices.

15. The method of communicating between a subscriber and a second party as claimed in claim 14 wherein the message is one of an audio message and a display message sent to the hosted application by way of the communication apparatus and one of a display message and an audio message is provided to the recipient from the hosted application by way of the communication apparatus.

16. The method of communicating between a subscriber and a second party as claimed in claim 14 wherein the message originator is the subscriber and the message is an audio message sent to the hosted application by way of the communication apparatus from one of the plurality of subscriber's 2-way communication devices and a display message is provided to the recipient's 2-way communication device, the recipient being the second party, from the hosted application by way of the communication apparatus.

17. The method of communicating between a subscriber and a second party as claimed in claim 14 wherein the message originator is the second party and the message is a display message sent to the hosted application by way of the communication apparatus from the second party's 2-way communication device and an audio message is provided to one of the plurality of recipient's 2-way communication devices, the recipient being the subscriber, from the hosted application by way of the communication apparatus.

18. The method of communicating between a subscriber and a second party as claimed in claim 14 wherein the unique designator is a secondary phone number.

19. The method of communicating between a subscriber and a second party as claimed in claim 14 wherein the step of providing the hosted application system includes coupling the hosted application system to the Internet and providing a hosted application website.

* * * * *